(12) United States Patent
Sorg et al.

(10) Patent No.: US 8,731,392 B2
(45) Date of Patent: May 20, 2014

(54) ILLUMINATION UNIT

(75) Inventors: Joerg Erich Sorg, Regensburg (DE);
Stefan Gruber, Bad Abbach (DE)

(73) Assignee: OSRAM Opto Semiconductors GmbH,
Regensburg (DE)

( * ) Notice: Subject to any disclaimer, the term of this patent is extended or adjusted under 35 U.S.C. 154(b) by 0 days.

(21) Appl. No.: 12/989,179

(22) PCT Filed: Apr. 16, 2009

(86) PCT No.: PCT/DE2009/000522
§ 371 (c)(1),
(2), (4) Date: Jan. 18, 2011

(87) PCT Pub. No.: WO2009/129784
PCT Pub. Date: Oct. 29, 2009

(65) Prior Publication Data
US 2011/0188846 A1      Aug. 4, 2011

(30) Foreign Application Priority Data

Apr. 25, 2008   (DE) .......................... 10 2008 020 817

(51) Int. Cl.
*G03B 15/02*   (2006.01)
*G03B 15/06*   (2006.01)

(52) U.S. Cl.
USPC ........................... 396/200; 362/3; 362/296.07

(58) Field of Classification Search
USPC ................................................ 396/200, 429
See application file for complete search history.

(56) References Cited

U.S. PATENT DOCUMENTS

| 3,720,822 | A  | * | 3/1973  | Rochester et al. ............... 362/6 |
| 3,747,488 | A  | * | 7/1973  | Bennett ........................ 396/200 |
| 3,821,590 | A  | * | 6/1974  | Kosman et al. ................ 313/499 |
| 7,136,672 | B2 | * | 11/2006 | Kitano et al. ................ 455/556.1 |
| 7,766,529 | B2 | * | 8/2010  | Hadlich et al. ................ 362/612 |
| 8,099,897 | B2 | * | 1/2012  | Elpedes et al. ................. 42/131 |
| 8,272,771 | B2 | * | 9/2012  | Arai ............................. 362/608 |
| 2002/0159161 | A1 |   | 10/2002 | Ouchi |
| 2003/0160259 | A1 | * | 8/2003  | Uemura ......................... 257/99 |
| 2004/0070855 | A1 |   | 4/2004  | Benitez et al. |
| 2004/0223315 | A1 | * | 11/2004 | Suehiro et al. ................. 362/84 |
| 2005/0201109 | A1 |   | 9/2005  | Shimura |
| 2006/0203468 | A1 | * | 9/2006  | Beeson et al. ................. 362/84 |
| 2006/0227302 | A1 |   | 10/2006 | Harbers et al. |
| 2006/0239673 | A1 | * | 10/2006 | Mansbridge ................. 396/155 |
| 2007/0012934 | A1 |   | 1/2007  | Abu-Ageel |
| 2007/0080337 | A1 | * | 4/2007  | Sorg ............................. 257/13 |

(Continued)

FOREIGN PATENT DOCUMENTS

CN     1181376     12/2004
CN     2691181     4/2005

(Continued)

*Primary Examiner* — Christopher Mahoney
(74) *Attorney, Agent, or Firm* — Cozen O'Connor

(57) ABSTRACT

A luminous unit (1) for an optical recording device (13) comprising a light source (2) for generating radiation and a partly reflective element, which is disposed downstream of the light source (2) in a main emission direction (H) and subdivides a space into a first half-space facing the light source (2) and a second half-space remote from the light source (2), wherein the partly reflective element at least partly transmits the radiation coming from the light source (2) from the first half-space and at least partly reflects the external radiation coming from an opposite direction from the second half-space.

6 Claims, 3 Drawing Sheets

(56) References Cited

U.S. PATENT DOCUMENTS

2007/0127908 A1* 6/2007 Oon et al. ............... 396/155
2008/0085111 A1* 4/2008 Fowler .................... 396/199
2009/0316384 A1* 12/2009 Kanayama et al. ......... 362/84
2010/0012959 A1 1/2010 Wilm et al.
2010/0014286 A1 1/2010 Yoneda et al.

FOREIGN PATENT DOCUMENTS

| CN | 1667313 | 9/2005 | | |
|----|---------|--------|---|---|
| DE | 10 2006 032 416 | 4/2007 | | |
| DE | 10 2006 046 199 | 4/2008 | | |
| WO | WO 2006/129570 | 12/2006 | | |
| WO | WO2007/144805 | * 12/2007 | ............... | G02B 6/42 |

* cited by examiner

ILLUMINATION UNIT

RELATED APPLICATIONS

This is a U.S. national stage of application No. PCT/DE2009/000522, filed on Apr. 16, 2009, and claims priority on German application No. 10 2008 020 817.5, filed on Apr. 25, 2008, the entire content of which is hereby incorporated by reference.

FIELD OF THE INVENTION

In the present case, a luminous unit is specified which is suitable, in particular for use in an optical recording device.

BACKGROUND OF THE INVENTION

Commercially available mobile telephones increasingly have integrated cameras and thus serve as optical recording devices. In order to improve the recording quality, the mobile telephone can have a flashlight arranged alongside a camera lens. As a further feature, alongside the flashlight and the camera lens, a mirror for self-portraits can be provided. A corresponding mobile telephone is illustrated in FIG. 6. Such a mobile telephone has a specific component for each function.

The flashlight can have, for example, a radiation-generating semiconductor chip with a converter that converts the generated radiation at least partly into radiation having a longer wavelength. In the case of a flashlight of this type, the various constituent parts are discernable to an observer.

SUMMARY OF THE INVENTION

One object of the invention is to provide a luminous unit whose constituent parts are not each individually discernable.

In accordance with one preferred embodiment, the luminous unit comprises a light source for generating radiation and a partly reflective element, which is disposed downstream of the light source in a main emission direction and subdivides a space into a first half-space facing the light source and a second half-space remote from the light source, wherein the partly reflective element partly transmits the radiation coming from the light source from the first half-space and partly reflects the external radiation coming from an opposite direction from the second half-space. In particular, the transmitted radiation illuminates the second half-space.

In accordance with a first variant, the partly reflective element is a partly transmissive mirror. By way of example, the partly transmissive mirror can be a coating that contains a metal or a metal compound or consists of a metal or a metal compound. Furthermore, the partly transmissive mirror can be a dichroic mirror. The reflected external radiation can be collimated by means of the partly transmissive mirror, such that an object situated in the second half-space is imaged through the partly transmissive mirror.

In accordance with a second variant, the partly reflective element is embodied in such a way that an object situated in the second half-space is not imaged. In particular, the partly reflective element in accordance with the second variant has a facet structure. Preferably, in this case, a surface of the partly reflective element which faces the object situated in the second half-space is embodied with a plurality of optical structural elements. The optical structural elements can be, for example, concavely or convexly shaped lenses. The partly reflective element advantageously has a regular arrangement composed of a plurality of optical structural elements.

In the case of such a luminous unit comprising a partly reflective element, the view of the light source advantageously can be blocked for an observer in the second half-space. Consequently, the external appearance of the light source can be hidden or masked. It is nevertheless possible for radiation generated by the light source to pass into the second half-space and illuminate the latter.

In accordance with one preferred configuration, the luminous unit has a beam-shaping optical element having a radiation entrance surface and a radiation exit surface. Preferably, the radiation entrance surface is arranged on a side of the beam-shaping optical element which faces the light source, while the radiation exit surface is situated on a side remote from the light source.

The radiation exit surface of the beam-shaping optical element can be convexly curved. The convexly curved radiation exit surface can effect a collimation of the radiation emitted in different directions by the light source. By way of example, by means of the beam-shaping optical element it is possible to obtain an emission characteristic which enables homogeneous illumination of a predefined delimited field in the second half-space. The limits of the field are situated, in particular, where the radiation intensity falls to a value of less than 50% of an average value assumed by the radiation intensity within the field. Homogeneous illumination is preferably provided when the deviation from the average radiation intensity within the delimited field is not more than 20%.

In accordance with one preferred configuration, the beam-shaping optical element is arranged between the light source and the partly reflective element.

In particular, the partly reflective element can be arranged on the radiation exit surface of the beam-shaping optical element. Consequently, the radiation emitted by the light source firstly experiences an interaction with the beam-shaping optical element before it impinges on the partly reflective element.

The partly reflective element can have a curvature corresponding to the radiation exit surface. Furthermore, the partly reflective element can have a planar form if the radiation exit surface is embodied in planar fashion.

In an application-specific manner, the partly trans-missive mirror can be convexly curved, concavely curved or else embodied in planar fashion. For an optical recording device such as a mobile telephone with an integrated camera, a convexly curved partly transmissive mirror is particularly suitable for recording a self-portrait. In particular, by means of the partly transmissive mirror, not only can the light source be masked, but also an object situated in the second half-space can be mirrored and imaged. Therefore, two functions can be fulfilled simultaneously by means of the partly transmissive mirror. This advantageous development can be realized in a particularly simple manner by the partly transmissive mirror being applied to the convexly curved radiation exit surface in the form of a coating and thus assuming the shape of the radiation exit surface.

In the case of a facet structure, the optical structural elements can be arranged along the curved or planar radiation exit surface, such that the partly reflective element likewise has a curvature corresponding to the radiation exit surface or a planar form. The arrangement composed of optical structural elements, which is a lens arrangement, in particular, can be embodied integrally with the optical element.

However, it is also conceivable for the partly reflective element to be embodied as a separate element and to be disposed downstream of the beam-shaping optical element in the main emission direction.

In accordance with one preferred embodiment, the optical element is embodied on the radiation entrance side as a convex or concave lens, Fresnel lens, TIR (Total Internal Reflection) lens or as an arrangement of individual lenses which can be arranged irregularly. This improves the coupling of radiation into the optical element and the guidance of the radiation in the optical element. In particular, in this case the partly reflective element is arranged on the radiation exit side.

In accordance with a further configuration, the partly reflective element can be arranged on the radiation entrance surface of the beam-shaping optical element. Consequently, in this variant, the radiation emitted by the light source impinges on the partly reflective element before an interaction with the beam-shaping optical element takes place.

The embodiment in which the partly reflective element is applied to the radiation exit surface and the embodiment in which the partly reflective element is applied to the radiation entrance surface have different advantages. In the first case, the partly reflective element preferably directly adjoins the surroundings, that is to say that the partly reflective element is uncovered and therefore has a substantially undiminished reflectivity. In the second case, the partly reflective element is covered by the beam-shaping optical element. Although this can reduce the reflectivity, the partly reflective element is thereby protected from the surroundings which counteracts a reduction of the reflectivity owing to effects from the surroundings, for example owing to scratches on the surface.

Preferably, the partly transmissive mirror is a coating applied to the radiation entrance surface of the beam-shaping optical element. In this way, the partly transmissive mirror can assume the shape of the radiation entrance surface.

Correspondingly, the partly reflective element provided with a facet structure can be arranged on the radiation entrance surface and in this way assume the shape of the radiation entrance surface.

In the case of a partly transmissive mirror, a concavely curved radiation entrance surface is particularly advantageous. This is because the mirror effect of a convex mirror can thereby be obtained for a mirroring object in the second half-space, said mirror being particularly suitable for use in an optical recording device such as, for instance, a mobile telephone with an integrated camera.

Furthermore, in this variant, the radiation exit surface can be convexly curved or embodied in planar fashion. In the case of a use of the luminous unit in an optical recording device, the planar embodiment has the advantage that the surface of the luminous unit terminates flush with the outer wall of the recording device.

In accordance with one preferred embodiment, an index-matching material is arranged between the light source and the radiation entrance surface. Said material has, in particular, a refractive index lying between the refractive index of the semiconductor chip and the refractive index of the optical element. It is thereby possible to reduce the sudden change in refractive index at the interfaces, which leads to lower reflections and thus to a reduction of radiation losses.

In accordance with one advantageous configuration, the partly transmissive mirror is partly reflective in a wide wavelength range. Suitable materials in this case are, in particular, metals or metal compounds. By way of example, the partly transmissive mirror can contain Ag or Au or consist thereof. Furthermore, the partly transmissive mirror can contain a metal oxide, in particular aluminum oxide or titanium oxide, or consist thereof. In this configuration, the layer thickness, which is preferably 1 nm to 20 nm, has a crucial influence on the partial transmissivity.

Alternatively, the partly transmissive mirror can be partly reflective in a limited wavelength range. A dichroic mirror is advantageously used in this case. Said dichroic mirror has a sequence of dielectric layers having alternately in each case a different refractive index. By way of example, a dichroic mirror can be used if the light source has visible colorations which an observer would see as disturbing upon observing the light source directly, but which can be hidden by a suitable dichroic mirror. This is because it is possible, by means of the dichroic mirror, to attenuate by reflection that color component in the external radiation which imparts to the coloration its specific color, such that the coloration is no longer visible to the observer.

The reflectivity of the partly transmissive mirror preferably lies in a range of between 5% and 80%.

In accordance with one preferred embodiment, the light source has a radiation-emitting semiconductor chip. The semiconductor chip can be produced, in particular, from materials based on nitride compound semiconductors, which in the present connection means that an active epitaxial layer sequence from which the semiconductor chip is formed or at least one layer thereof comprises a nitride III/V compound semiconductor material, preferably $Al_nGa_mIn_{1-n-m}N$, where $0 \leq n \leq 1$, $0 \leq m \leq 1$ and $n+m \leq 1$.

By means of a conversion element disposed downstream of the semiconductor chip in the main emission direction, part of the radiation emitted by the semiconductor chip can be wavelength-converted, such that this radiation component has a higher wavelength than the original radiation. The light source consequently emits a mixed-colored overall radiation.

By way of example, the semiconductor chip can emit blue light, which is converted partly into yellow light by means of the conversion element, such that the light source emits white light. In this case, an observer is given a yellow color impression upon directly observing the switched-off light source through the conversion element. The light source thus has a yellow coloration for the observer. As already mentioned, the coloration can advantageously be masked by means of the partly reflective element.

In accordance with one preferred configuration, the light source is a flashlight, that is to say that the light source is embodied as an illumination device which, during a recording of an object in the second half-space, produces a flash of light which provides for the necessary illumination of the object. The flashlight can have, for example, a radiation-emitting semiconductor chip of the type described above or a gas discharge lamp, for example a xenon lamp.

It should be noted that the light source can emit electromagnetic radiation in the visible spectral range, in the near infrared or ultraviolet spectral range.

By way of example, a luminous unit comprising a light source which emits radiation in the infrared spectral range can advantageously be used for an autofocus device in a mobile telephone.

In accordance with one advantageous embodiment, an optical recording device, in particular a mobile telephone with an integrated camera, has a luminous unit of the type mentioned above and a camera lens. If the partly reflective element is a partly transmissive mirror, then the luminous unit is arranged alongside the camera lens in such a way that an object mirrored in the partly transmissive mirror is situated in the recording range of the camera lens. This embodiment advantageously makes it possible to record self-portraits.

It should be noted that the optical recording device can also be a photographic camera, for example.

BRIEF DESCRIPTION OF THE DRAWINGS

Identical or identically acting elements are provided with the same reference symbols in the figures.

In FIGS. 1 to 6, the partly reflective element described is in each case a partly transmissive mirror. However, the partly transmissive mirror can also be replaced by a partly reflective element having a facet structure as described above.

FIG. 1 shows a first exemplary embodiment of a luminous unit 1 comprising a light source 2 and a partly transmissive mirror 3, which is disposed downstream of the light source 2 in a main emission direction H. The partly transmissive mirror 3 subdivides a space into a half-space (not identified in FIG. 1) facing the light source 2 and into a half-space (not identified in FIG. 1) remote from the light source 2. A beam-shaping optical element 4 is arranged between the partly transmissive mirror 3 and the light source 2, with which element the radiation generated by the light source 2 interacts before it impinges on the partly transmissive mirror 3.

The partly transmissive mirror 3 is applied to a radiation exit surface 4a of the beam-shaping optical element 4 in the form of a coating. Preferably, no further layers are situated between the radiation exit surface 4a and the partly transmissive mirror 3, which can consist of a metal layer, a metal oxide layer or a sequence of dielectric layers having an alternative refractive index. The coating can be vapor-deposited or sputtered onto the radiation exit surface 4a, for example.

The radiation exit surface 4a is convexly curved, which preferably leads to a collimation of the radiation passing through. As a result of the partly transmissive mirror 3 being applied to the radiation exit surface 4a, said mirror likewise has a convex curvature.

Figure 1:
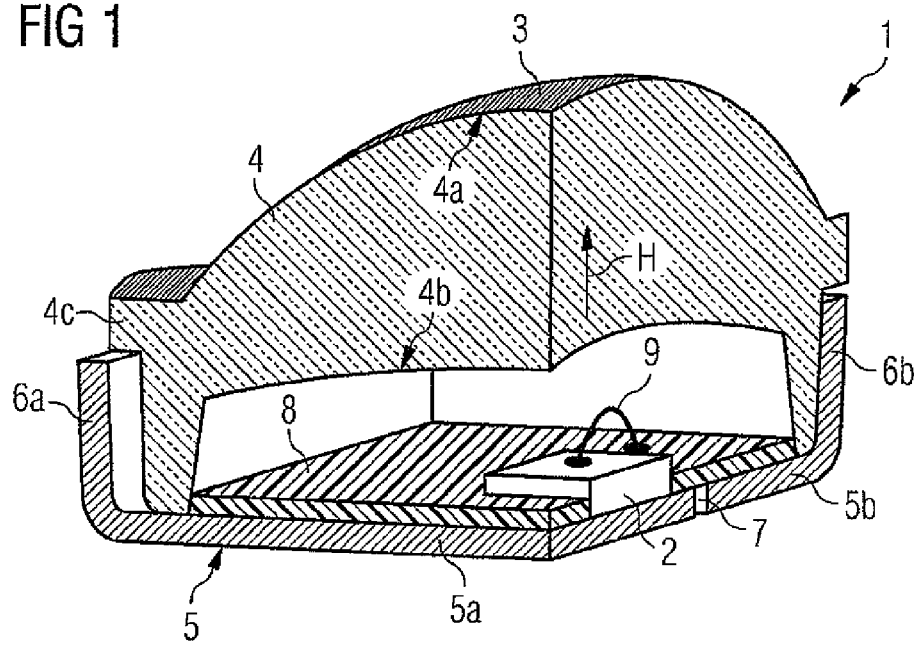
FIG. 1 shows a schematic perspective illustration of an excerpt from a first exemplary embodiment of a luminous unit.

As is illustrated in FIG. 1, by contrast, the radiation entrance surface 4b lying opposite the radiation exit surface 4a can be concavely curved. This improves the coupling of radiation into the beam-shaping optical element 4.

The beam-shaping optical element 4 has a spacer 4c on a side facing the light source 2, the height of said spacer being chosen such that the light source 2 is at a suitable distance from the beam-shaping optical element 4. The spacer 4c simultaneously serves as fixing means for the beam-shaping optical element 4. This is because the spacer 4c is plugged into a carrier 5 such that the spacer 4c is seated on planar carrier surfaces 5a and 5b of the carrier 5 and is arranged within side surfaces 6a and 6b of the carrier 5, which are bent out of the plane of the carrier surfaces 5a and 5b.

The carrier 5 has a first partial carrier having the carrier surface 5a and the at least one side surface 6a and a second partial carrier having the carrier surface 5b and the at least one side surface 6b. There is a gap 7 between the two partial carriers. The two partial carriers are held together by an insert 8 in the carrier 5.

Preferably, the two partial carriers are formed from an electrically conductive material, such that the first partial carrier forms a first electrical contact and the second partial carrier forms a second electrical contact of the light source 2. The insert 8 advantageously contains an electrically insulating material, such that the first partial carrier is electrically insulated from the second partial carrier.

The light source 2 has a radiation-emitting semiconductor chip and a conversion element arranged on the semiconductor chip. In particular, the semiconductor chip emits radiation in the short-wave visible spectral range such as blue light, for instance. Furthermore, the conversion element can convert part of the radiation into yellow light, such that the luminous unit emits white light overall.

Advantageously, yellow colorations on the chip surface which are caused by the conversion element can be masked by the partly transmissive mirror 3, such that an observer in the second half-space does not perceive said colorations. However, the partly transmissive mirror 3 does not prevent radiation components of the blue and yellow light from the light source 2 from passing into the second half-space. Consequently, the second half-space can be illuminated by the mixed-colored overall radiation.

By means of the beam-shaping optical element 4 it is possible to obtain an emission characteristic suitable, in particular, for illuminating a delimited field. By way of example, the delimited field can be the face of an observer in the second half-space.

In the case of a use of the luminous unit 1 illustrated in FIG. 1 in an optical recording device, the light source 2 is advantageously a flashlight which sufficiently illuminates the face of the observer.

The partly transmissive mirror 3 makes it easier for the observer to record a self-portrait. If the observer sees his/her mirror image, then he/she is situated in the recording range of a camera lens and can thus be certain that a corresponding image will be photographed.

The luminous unit 1 is constructed in a space-saving manner by virtue of the integrated light source 2 and the integrated mirror 3.

Figure 2:
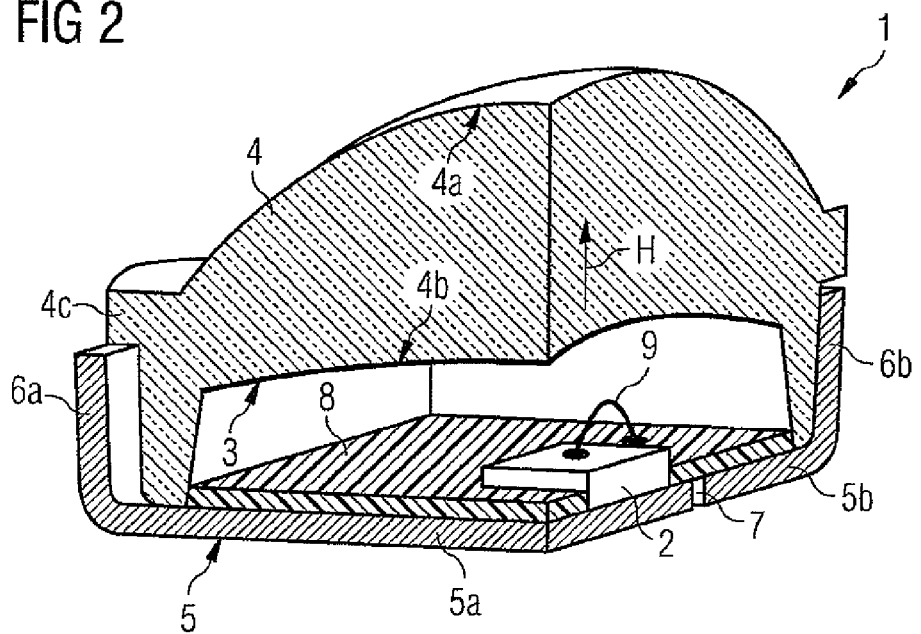
FIG. 2 shows a schematic perspective illustration of an excerpt from a second exemplary embodiment of a luminous unit.

The second exemplary embodiment of a luminous unit 1 as illustrated in FIG. 2 is constructed similarly to the first exemplary embodiment. In this case, too, the beam-shaping optical element 4 is fixed to the carrier 5 by means of the spacer 4c plugged into the carrier 5. The light source 2 is arranged on the carrier 5 and is situated in an opening in the insert 8, said opening being provided for the light source 2.

In contrast to the first exemplary embodiment, however, the partly transmissive mirror 3 is not disposed downstream of the beam-shaping optical element 4 in the main emission direction H, but rather is situated upstream of the beam-shaping optical element 4 in the main emission direction H.

In particular, the partly transmissive mirror 3 is applied on the radiation entrance surface 4b of the beam-shaping optical element 4. This arrangement has the advantage that the partly transmissive mirror 3 is protected from reflection-reducing effects from the surroundings such as scratches, for example.

The radiation entrance surface 4b is concavely curved such that the same mirror effect as in the first exemplary embodiment is brought about for the external radiation impinging on the partly transmissive mirror 3 from the second half-space, namely the mirror effect of a convex mirror.

In order to reduce radiation losses, an index-matching material (not identified in FIG. 2) is advantageously arranged between the light source 2 and the radiation entrance surface 4b. In particular, the index-matching material fills the cavity between the beam-shaping optical element 4 and the carrier 5.

Figure 3:
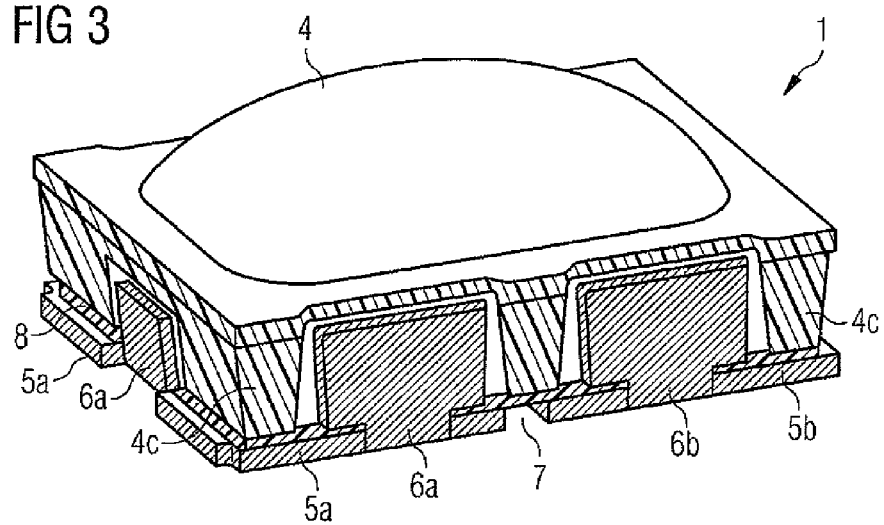
FIG. 3 shows a schematic perspective illustration of a luminous unit in accordance with the first or second exemplary embodiment.

FIG. 3 shows how the luminous unit 1 in accordance with the first or second exemplary embodiment can appear as viewed from outside. As illustrated, the beam-shaping optical element 4 can form a housing cover and the carrier 5 can form a housing base of the luminous unit 1. In this case, the spacer 4c serves as a side wall that surrounds the light source 2 on all four sides. The spacer 4c can have, on all four sides, indentations into which the side surfaces 6a, 6b engage. The arrangement described advantageously prevents the beam-shaping optical element 4 from slipping relative to the carrier 5.

Figure 4:
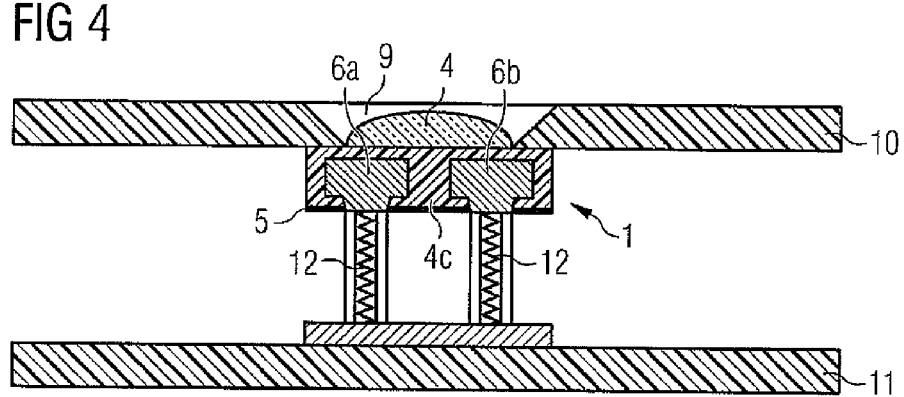
FIG. 4 shows a schematic cross sectional illustration of an excerpt from an exemplary embodiment of an optical recording device.

FIG. 4 shows an excerpt from an optical recording device comprising a luminous unit 1 of the type described above. The optical recording device has a first wall 10 and a second wall 11, wherein a cutout 9 for the luminous unit 1 is provided in the first wall 10. The luminous unit 1 is arranged such that the beam-shaping optical element 4 projects into the cutout 9.

In order to increase the radiation intensity, the cutout can be embodied as a reflector, that is to say that the at least one side wall which faces the beam-shaping optical element 4 and delimits the cutout has a comparatively high reflectivity.

The electrical connection of the luminous unit 1 is effected via the second wall 11, which is electrically conductively connected to the carrier 5 of the luminous unit 1. Contact means 12, which are preferably spring elements, provide for the electrical connection. The spring elements have the advantage that the same contact means 12 can be used for different distances between the first and the second wall 10, 11.

If the contact means 12 have a small diameter, relatively little heat dissipation takes place through the contact means 12. Additional cooling can advantageously be effected via the thermally conductive side surfaces 6a, 6b.

Figure 5:
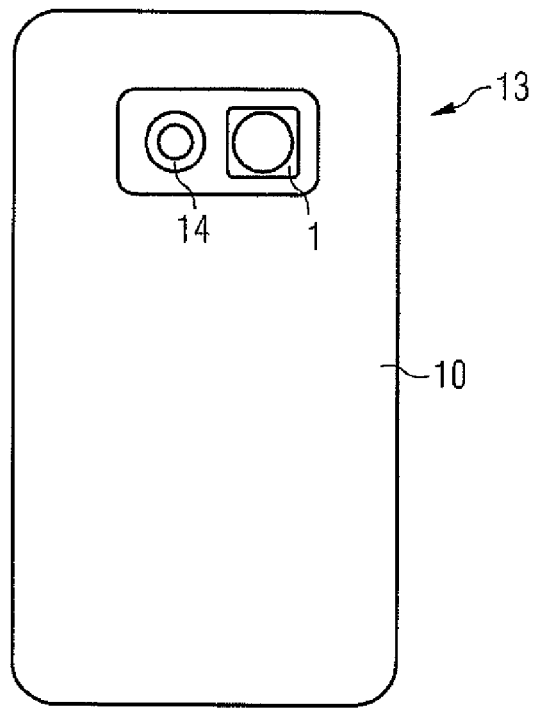
FIG. 5 shows a schematic illustration of a plan view of the exemplary embodiment of an optical recording device as illustrated in FIG. 4.

FIG. 5 illustrates an optical recording device 13 that can be constructed in the manner shown in FIG. 4. By way of example, the optical recording device 13 is a mobile telephone. In the first wall 10, a camera lens 14 is provided alongside the luminous unit 1.

The luminous unit 1 with integrated light source and integrated partly transmissive mirror fulfills two functions. Firstly, an object/subject that is situated in front of the camera lens 14 and is intended to be photographed can be illuminated sufficiently by the luminous unit 1, which has a flashlight, in particular. Secondly, the subject can position himself/herself correctly for recording a self-portrait by means of the luminous unit 1.

Figure 6:
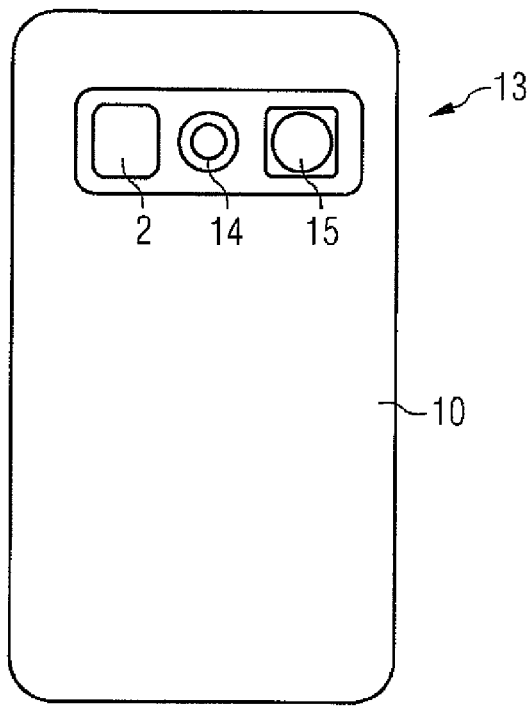
FIG. 6 shows a schematic illustration of a plan view of a conventional mobile telephone.

FIG. 6 shows a conventional mobile telephone 13, which, by contrast provides separate elements for the two functions, a light source 2 and a mirror 15.

As is evident from FIGS. 5 and 6, the luminous unit 1 is comparatively space-saving. Moreover, the partly transmissive mirror contained in the luminous unit 1 masks the light source, such that possibly disturbing colorations of the light source are concealed.

The invention is not restricted by the description on the basis of the exemplary embodiments. Rather, the invention encompasses any novel feature and also any combination of features, which in particular includes any combination of features in the patent claims, even if this feature or this combination itself is not explicitly specified in the patent claims or exemplary embodiments.

The invention claimed is:

1. A luminous unit for an optical recording device comprising:
   a light source for generating radiation
   a partly reflective element, which is disposed downstream of the light source in a main emission direction and subdivides a space into a first half-space facing the light source and a second half-space remote from the light source,
   wherein the partly reflective element at least partly transmits the radiation coming from the light source from the first half-space and at least partly reflects the external radiation coming from an opposite direction from the second half-space,
   wherein the partly reflective element is a partly transmissive mirror,
   wherein the luminous unit comprising a beam-shaping optical element having a radiation exit surface and a radiation entrance surface,
   wherein the partly reflective element is arranged on the radiation entrance surface of the beam-shaping optical element, and
   wherein the radiation entrance surface is concavely curved and the partly reflective element has a curvature corresponding to the radiation entrance surface.

2. The luminous unit as claimed in claim 1, wherein the radiation exit surface of the beam-shaping optical element is convexly curved or is embodied in planar fashion.

3. The luminous unit as claimed in claim 1, wherein the optical element is embodied on the radiation entrance side as a convex or concave lens, Fresnel lens, TIR lens or arrangement of individual lenses.

4. The luminous unit as claimed in claim 1, wherein the transmissive mirror is a coating applied to the radiation entrance surface of the beam-shaping optical element.

5. An optical recording device comprising a luminous unit of claim 1 and a camera lens wherein the luminous unit is arranged alongside the camera lens.

6. The luminous unit of claim 1, wherein the partly transmissive mirror contains a metal or a metal compound, consists of a metal or a metal compound or is a dichroic mirror.

* * * * *